US012632784B2

(12) United States Patent
Lee et al.

(10) Patent No.: US 12,632,784 B2
(45) Date of Patent: May 19, 2026

(54) SYSTEM, METHOD, AND COMPUTER-READABLE STORAGE MEDIUM FOR FEDERATED LEARNING OF LOCAL MODEL BASED ON LEARNING DIRECTION OF GLOBAL MODEL

(71) Applicant: Korea Advanced Institute of Science and Technology, Daejeon (KR)

(72) Inventors: Gi Hun Lee, Daejeon (KR); Min Chan Jeong, Daejeon (KR); Se Young Yun, Daejeon (KR); Sang Min Bae, Daejeon (KR); Jae Yeon Ahn, Daejeon (KR); Seong Yoon Kim, Daejeon (KR); Woo Jin Chung, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 830 days.

(21) Appl. No.: 17/974,545

(22) Filed: Oct. 27, 2022

(65) Prior Publication Data

US 2023/0136378 A1 May 4, 2023

(30) Foreign Application Priority Data

Nov. 3, 2021 (KR) ........................ 10-2021-0149758
Jun. 20, 2022 (KR) ........................ 10-2022-0075187

(51) Int. Cl.
*G06N 20/00* (2019.01)
*H04L 67/00* (2022.01)

(52) U.S. Cl.
CPC ............. *G06N 20/00* (2019.01); *H04L 67/34* (2013.01)

(58) Field of Classification Search
CPC .......... G06N 20/00; G06N 3/09; G06N 3/098; H04L 67/34
See application file for complete search history.

(56) References Cited

U.S. PATENT DOCUMENTS

| | | | |
|---|---|---|---|
| 2020/0050951 A1* | 2/2020 | Wang | G06N 20/00 |
| 2020/0234100 A1* | 7/2020 | Ramanan | G06N 20/10 |
| 2020/0293887 A1* | 9/2020 | De Brouwer | G06N 3/09 |
| 2021/0326757 A1 | 10/2021 | Rawat et al. | |

(Continued)

FOREIGN PATENT DOCUMENTS

| | | | | |
|---|---|---|---|---|
| KR | 10-2020-0083234 A | 7/2020 | | |
| KR | 10-2021-0015531 A | 2/2021 | | |
| WO | WO-2018112514 A1 * | 6/2018 | .............. | G06T 1/20 |

OTHER PUBLICATIONS

Notice of Allowance of the KR Patent Application No. 10-2022-0075187 dated Dec. 11, 2025.

*Primary Examiner* — Ryan Barrett
(74) *Attorney, Agent, or Firm* — NKL LAW; Jae Youn Kim

(57) ABSTRACT

Proposed is a federated learning system. The federated learning system comprises: a central server configured to transmit at least one global parameter of a global model to each client device, receive at least one local parameter of a local model trained from each of client devices, and update the global model using the at least one local parameter; and a plurality of client devices configured to train the local model by applying a loss between a predicted value of the global model and a predicted value of the local model possessed by itself to a loss function, and transmit at least one local parameter of the trained local model to the central server.

17 Claims, 6 Drawing Sheets

(56)                    References Cited

U.S. PATENT DOCUMENTS

| | | | |
|---|---|---|---|
| 2021/0336857 A1 | 10/2021 | Arora et al. | |
| 2022/0201021 A1* | 6/2022 | Joshi ................... | H04L 63/1416 |
| 2022/0253752 A1* | 8/2022 | Kim ...................... | G06N 20/20 |
| 2022/0284353 A1* | 9/2022 | Mostafa ................... | G06N 7/01 |
| 2022/0292392 A1* | 9/2022 | Anwar ............... | G06F 16/2453 |
| 2022/0335269 A1* | 10/2022 | Zhang ...................... | G06N 3/02 |
| 2022/0343219 A1* | 10/2022 | Takasaki ............... | G06N 20/00 |
| 2023/0065937 A1* | 3/2023 | Satheesh Kumar ... | G06N 3/098 |
| 2023/0068386 A1* | 3/2023 | Akdeniz ............... | G06N 3/084 |
| 2023/0084507 A1* | 3/2023 | Zhou ...................... | G06N 20/00 |
| | | | 706/12 |

* cited by examiner

FIG.5

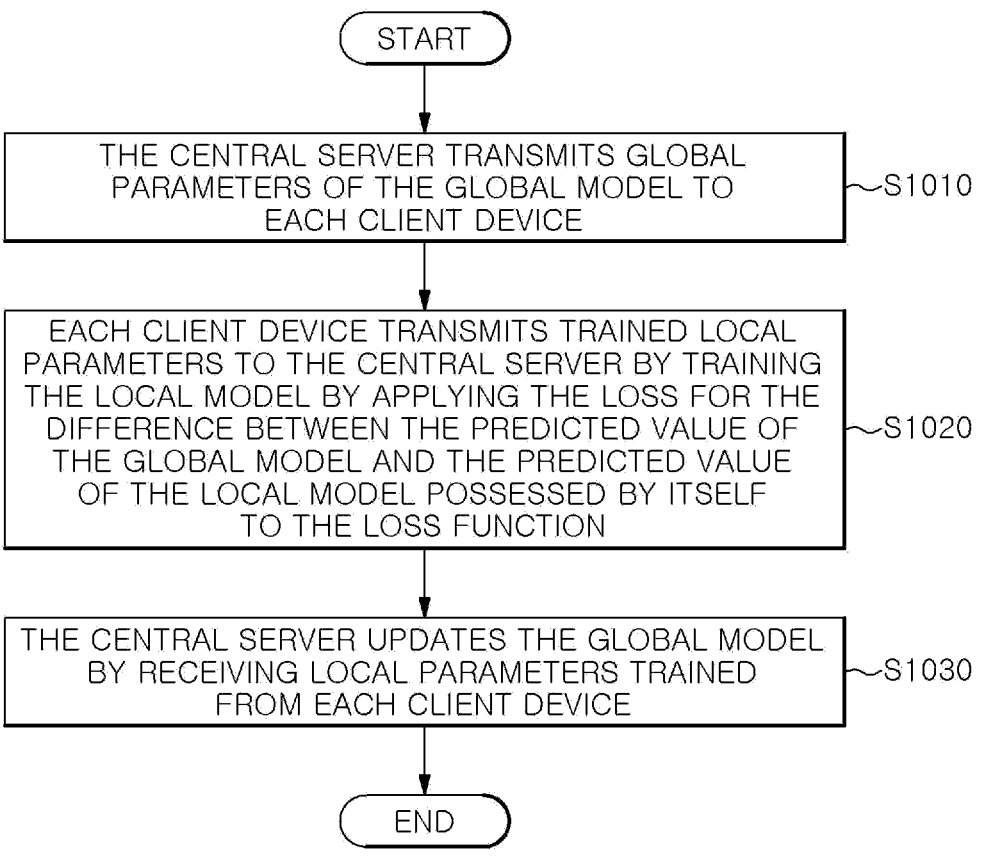

START

THE CENTRAL SERVER TRANSMITS GLOBAL PARAMETERS OF THE GLOBAL MODEL TO EACH CLIENT DEVICE ∼S1010

EACH CLIENT DEVICE TRANSMITS TRAINED LOCAL PARAMETERS TO THE CENTRAL SERVER BY TRAINING THE LOCAL MODEL BY APPLYING THE LOSS FOR THE DIFFERENCE BETWEEN THE PREDICTED VALUE OF THE GLOBAL MODEL AND THE PREDICTED VALUE OF THE LOCAL MODEL POSSESSED BY ITSELF TO THE LOSS FUNCTION ∼S1020

THE CENTRAL SERVER UPDATES THE GLOBAL MODEL BY RECEIVING LOCAL PARAMETERS TRAINED FROM EACH CLIENT DEVICE ∼S1030

END

FIG.6

NIID Partition Strategy : Sharding

| Method | MNIST | CIFAR-10 | | | | CIFAR-100 | CINIC-10 |
| --- | --- | --- | --- | --- | --- | --- | --- |
| | | s = 2 | s = 3 | s = 5 | s = 10 | | |
| FedAvg [39] | 78.63 (0.20) | 40.14 (0.59) | 51.10 (0.46) | 57.17 (0.37) | 64.91 (0.26) | 25.57 (0.49) | 39.64 (0.59) |
| FedCurv [45] | 78.56 (0.21) → | 44.52 (0.53) ↑ | 49.00 (0.47) → | 54.61 (0.39) → | 62.19 (0.27) → | 22.89 (0.49) → | 40.45 (0.57) ← |
| FedAvgM [19] | 80.81 (0.18) ← | 37.30 (0.61) → | 50.80 (0.46) → | 63.53 (0.32) ← | 69.36 (0.24) ↑ | 28.22 (0.46) ↑ | 36.04 (0.62) → |
| FedProx [32] | 78.26 (0.21) → | 41.48 (0.57) ← | 51.65 (0.45) ← | 56.88 (0.37) → | 64.65 (0.25) → | 25.10 (0.49) → | 41.47 (0.57) ← |
| FedNova [50] | 77.04 (0.21) → | 42.62 (0.56) ← | 52.03 (0.44) ← | 62.14 (0.30) ← | 66.97 (0.20) ↑ | 26.96 (0.41) ↑ | 42.55 (0.56) ← |
| SCAFFOLD [21] | 81.05 (0.17) ← | 44.60 (0.53) ← | 54.26 (0.39) ← | 65.74 (0.23) ↑ | 68.97 (0.16) ↑ | 30.82 (0.36) ↑ | 42.66 (0.54) ← |
| MOON [30] | 75.56 (0.23) → | 38.51 (0.60) → | 50.47 (0.47) → | 56.69 (0.39) → | 65.30 (0.25) ↑ | 25.29 (0.48) → | 37.07 (0.62) → |
| FedNTD (Ours) | 84.44 (0.13) ← | 52.61 (0.43) ← | 58.18 (0.34) ← | 64.93 (0.23) ← | 68.56 (0.15) ↑ | 31.69 (0.32) ↑ | 48.07 (0.48) ← |

SYSTEM, METHOD, AND COMPUTER-READABLE STORAGE MEDIUM FOR FEDERATED LEARNING OF LOCAL MODEL BASED ON LEARNING DIRECTION OF GLOBAL MODEL

TECHNICAL FIELD

The present invention relates to a system, a method, a computer-readable recording medium, and a computer program for federated learning of a local model based on a learning direction of a global model.

This work was supported by Institute of Information & communications Technology Planning & Evaluation (IITP) grant funded by Korea government (MSIT) No. 2021-0-00907, Development of Adaptive and Lightweight Edge-Collaborative Analysis Technology for Enabling Proactively Immediate Response and Rapid Learning.

CROSS-REFERENCE TO RELATED APPLICATIONS

This application claims the priority of Korean Patent Application No. 10-2021-0149758 filed on Nov. 3, 2021 and Korean Patent Application No. 10-2022-0075187 filed on Jun. 20, 2022, in the Korean Intellectual Property Office, the disclosure of which is incorporated herein by reference.

BACKGROUND

Recently, with the development of cloud and big data technologies, artificial intelligence (AI) technology is being applied to various services. In order to apply such artificial intelligence technology to services, the procedure of learning an artificial intelligence model based on a large amount of data is preceded.

Learning an artificial intelligence model requires significant computer resources to perform large-scale computations. For example, the cloud computing service is a service that provides a cloud computing infrastructure to learn the artificial intelligence model without installing complex hardware and software. Because cloud computing is based on centralization of resources, all necessary data should be stored in cloud memory and utilized for model learning. Data centralization offers many advantages in terms of maximizing efficiency, but there is a risk of leakage of user personal data and significant network costs are incurred as data transfer is involved.

SUMMARY

Recently, federated learning has been actively studied to overcome these problems. But, the federated learning cause problem that loses the learning direction of a learning model.

The problem to be solved by the present disclosure is to provide a federated learning system, method, computer-readable recording medium and computer program for local models of each client device to train parameters according to the learning direction based on global models in that various problems may be caused due to data imbalance of each client device used for the federated learning.

However, the problem to be solved by the present disclosure is not limited as mentioned above, and although not mentioned, it may include a purpose that can be clearly understood by those of ordinary skill in the art to which the present disclosure belongs from the description below.

In accordance with an aspect of the present disclosure, there is provided a federated learning system, the federated learning system comprises: a central server configured to transmit global parameters of a global model to each client device and update the global model by receiving local parameters trained from each client device; and a plurality of client devices configured to transmit trained local parameters to the central server by training a local model by applying a loss for a difference between a predicted value of the global model and a predicted value of the local model possessed by itself to a loss function.

The plurality of client devices may be configured to store: the global model that operates while maintaining the global parameters; and the local model that generates local parameters in which the global parameters are updated using the data possessed by itself.

The loss function of the local model may comprise: a first loss function configured to make a difference between a correct value of data possessed by a user and the predicted value of the local model smaller; and a second loss function configure to make a difference between the predicted value of the global model and the predicted value of the local model smaller.

The second loss function may comprise the of the predicted value of the global model and the predicted value of the local model for a class corresponding to FALSE among output classes of training data, and sets the loss of the predicted value of the global model and the predicted value of the local model for a class corresponding to TRUE among the output classes of the training data to 0.

The first loss function may comprise cross-entropy function for the correct value of the data possessed by the client device and the predicted value of the local model, and the second loss function comprises cross-entropy function for the predicted value of the global model and a probability of the predicted value of the local model.

The loss function of local model may be configured as a sum of a value obtained by applying a weight indicating the degree of reflection of the global model to the second loss function and the first loss function.

The weight may be set to a real value in the range greater than or equal to 0 and less than or equal to 1.

The predicted value may comprise a probability value output by passing a logit function and a softmax function to an output value of the global model or the local model.

In accordance with another aspect of the present disclosure, there is provided a federated learning method performed by a central server and a plurality of client devices, the method comprises: transmitting, by the central server, global parameters of a global model to each client device; transmitting trained local parameters to the central server by training a local model by applying a loss for the difference between the predicted value of the global model and the predicted value of the local model possessed by itself to a loss function; and updating the global model by receiving the local parameters trained from each client device by the central server.

The plurality of client devices may be configured to store the global model that operates while maintaining the global parameters, and the local model that generates local parameters in which the global parameters are updated using data possessed by the client device.

The loss function of the local model may comprise: a first loss function configured to make a difference between a correct value of data possessed by a user and the predicted value of the local model smaller; and a second loss function configure to make a difference between the predicted value of the global model and the predicted value of the local model smaller.

The second loss function may comprise the loss of the predicted value of the global model and the predicted value of the local model for a class corresponding to FALSE among output classes of training data, and sets the loss of the predicted value of the global model and the predicted value of the local model for a class corresponding to TRUE among the output classes of the training data to 0.

The first loss function may comprise cross-entropy function for the correct value of the data possessed by the client device and the predicted value of the local model, and the second loss function comprises cross-entropy function for the predicted value of the global model and a probability of the predicted value of the local model.

The loss function of local model may be configured as a sum of a value obtained by applying a weight indicating the degree of reflection of the global model to the second loss function and the first loss function.

The weight may be set to a real value in the range greater than or equal to 0 and less than or equal to 1.

The predicted value may comprise a probability value output by passing a logit function and a softmax function to an output value of the global model or the local model.

In accordance with another aspect of the present disclosure, there is provided a non-transitory computer-readable recording medium storing a computer program, comprising commands for a processor to perform a federated learning method, the method comprises: acquiring global parameters of a global model; training a local model by applying a loss for a difference between a predicted value of the global model and a predicted value of the local model possessed by itself to a loss function; and transmitting trained local parameters to a central server.

According to an embodiment of the present disclosure, the loss of the difference between the predicted value of the global model and the predicted value of the local model possessed by the client device is applied to a loss function used for learning the local model, and the forgetting problem can be prevented by having the local models of each client device to follow the learning direction based on the global model.

The effects obtainable in the present disclosure are not limited to the above-mentioned effects, and other effects not mentioned may be clearly understood by those of ordinary skill in the art to which the present disclosure belongs from the description below.

BRIEF DESCRIPTION OF THE DRAWINGS

FIG. 5 is a flowchart of the federated learning method according to the embodiment of the present disclosure.

FIG. 6 is comparison table of accuracies measured by applying the same dataset in a plurality of client devices with a federated learning model (FedNTD) generated by the federated learning system according to the embodiment of the present disclosure and with a federated learning model generated by an existing federated learning algorithm.

DETAILED DESCRIPTION OF THE EMBODIMENTS

Figure 1:
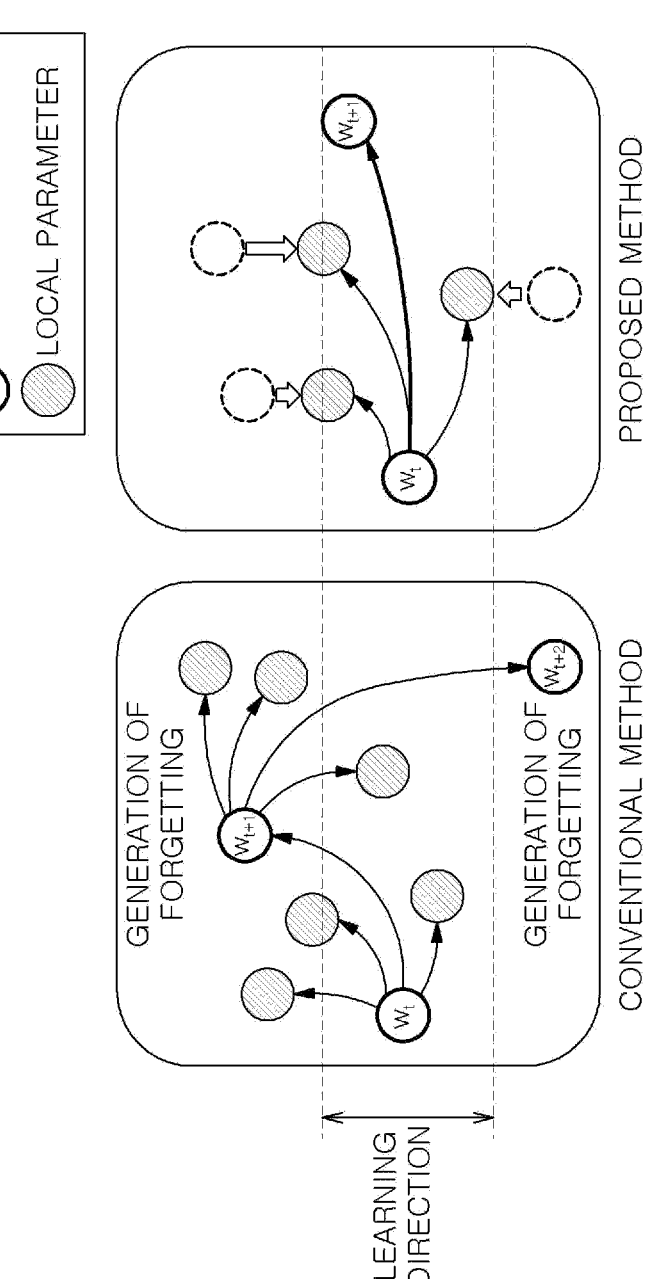
FIG. 1 is an exemplary diagram for explaining a problem that may occur in a federated learning process

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

Federated learning is a training method that centrally collects the models trained by each client device based on individual data possessed by multiple client devices, rather than training by centrally collecting the user personal data as in the past. Since such federated learning does not centrally collect user personal data, there is little possibility of invasion of privacy, and network cost can be reduced because only the parameters of the updated model can be transmitted.

On the other hand, in general, the actual data sets of each client device used for federated learning are different from each other in number, type, distribution, etc. in most cases. In this case, since each client device trains only from the data possessed by itself, individually trained parameters may have their values updated without references to the learning direction.

FIG. 1 is an exemplary diagram for explaining a problem that may occur in the federated learning process.

Referring to FIG. 1, the actual dataset of each client device used for the federated learning is mostly different from each other in number, type, distribution, and the like in conventional method. In this case, since each client device trains only from the data possessed by itself, individually trained parameters may have their values updated without references for the learning direction.

Therefore, each local parameter individually generated by each client device is highly likely to have a deviation in the direction in which the model derives the predicted value, and in case that the central server updates the global model by collecting the local parameters, the global model also loses the learning direction, which may cause a catastrophic forgetting problem.

Accordingly, the embodiment of this document provides a method for allowing the local models of each client device to train parameters that follow the learning direction based on the global model, as shown in FIG. 1.

Figure 2:
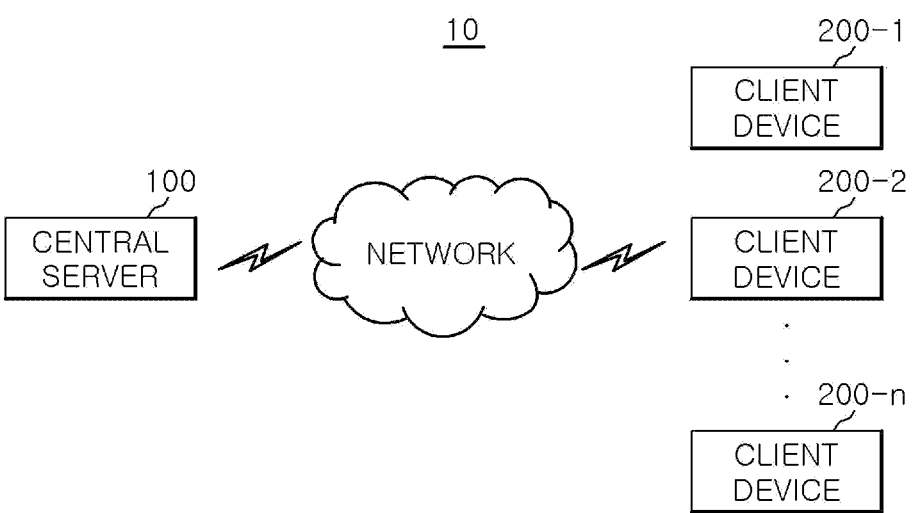
FIG. 2 is a block diagram of a federated learning system according to an embodiment of the present disclosure.

FIG. 2 is a block diagram of a federated learning system 10 according to the embodiment of the present disclosure.

Referring to FIG. 2, the federated learning system 10 according to the embodiment may include a central server 100 and a plurality of client devices 200.

The central server 100 and the client device 200 are computing devices including a memory and a processor, and overall operations may be performed by instructions stored in the memory and operations of the processor.

The central server 100 and the client device 200 may store an artificial intelligence neural network model designed with the same structure to perform federated learning.

Hereinafter, an artificial intelligence neural network model used for federated learning according to the embodiment of this document will be referred to as a 'federated learning model'. Further, if it is necessary to separately explain the device in which the 'federated learning model' is stored, the federated learning model stored in the central server 100 will be referred to as a 'global model', and the federated learning model stored in the client device 200 will be referred to as a 'local model' separately. In addition, the parameters applied to the 'global model' will be referred to as 'global parameters' and the parameters applied to the 'local model' will be referred to as 'local parameters'.

Figure 3:
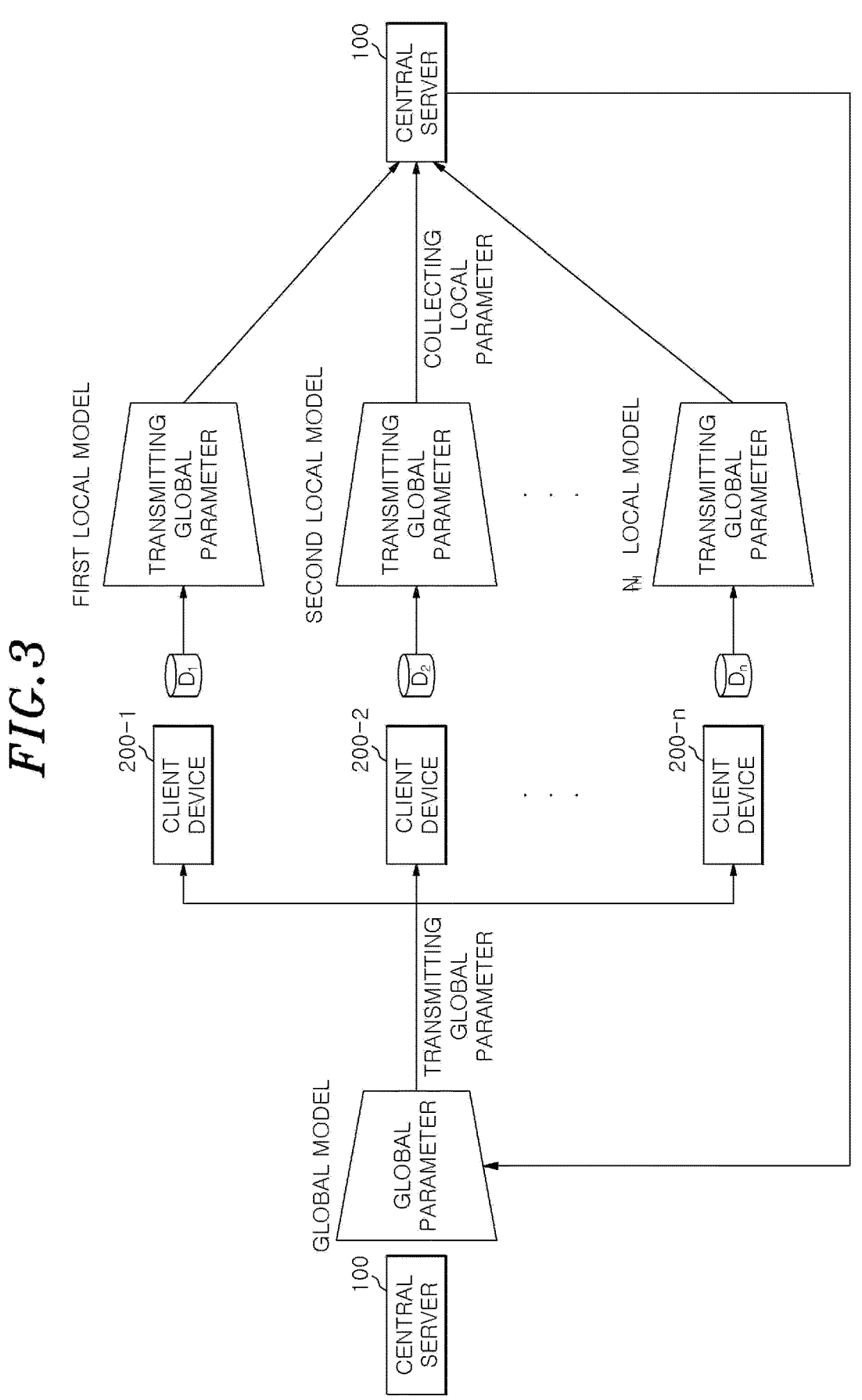
FIG. 3 is an exemplary diagram of a general operation in which a central server and a client device constituting the federated learning system train the federated learning model according to the embodiment of the present disclosure.

FIG. 3 is an exemplary diagram of a general operation in which the central server 100 and the client device 200 constituting the federated learning system 10 train the federated learning model according to the embodiment of the present disclosure.

First, the central server 100 may transmit the global parameter value set in the global model to each client device 200.

Next, each client device 200 may train a local model using the data (D1, D2, . . . , Dn) possessed by itself, and transmit the local parameters of the trained local model to the central server 100.

Thereafter, the central server 100 may update the parameters of the global model by collecting the parameters of the local model trained by each client device 200.

As such, a series of processes in which the central server 100 transmits parameters to the client device 200 to collect newly trained parameters and then updates the model may be understood as one round of the federated learning. A round of the federated learning may be conducted in a plurality of rounds depending upon the design, and parameters of the global model updated after the final round is performed may be determined as parameters of the final federated learning model.

At this time, the central server 100 may select some client devices 200 among a plurality of client devices 200 for each round of the federated learning according to a predetermined method (e.g., FedAvg, FedSGD, FedMA, etc.) and transmit the global parameters.

In this case, the central server 100 may update the parameters of the global model by combining the local parameters collected from the client device 200 according to the predetermined method (e.g., FedAvg, FedSGD, FedMA, etc.).

Meanwhile, in federated learning, if the number, the type, the distribution, etc. of data held by each client device 200 are different from each other, a forgetting problem may occur. In order to solve this point, the federated learning system 10 according to the embodiment of this document provides a method to train the local model by applying a loss for the difference between the predicted value of the global model and the predicted value of the local model to a loss function at the stage of each client device 200.

Figure 4:
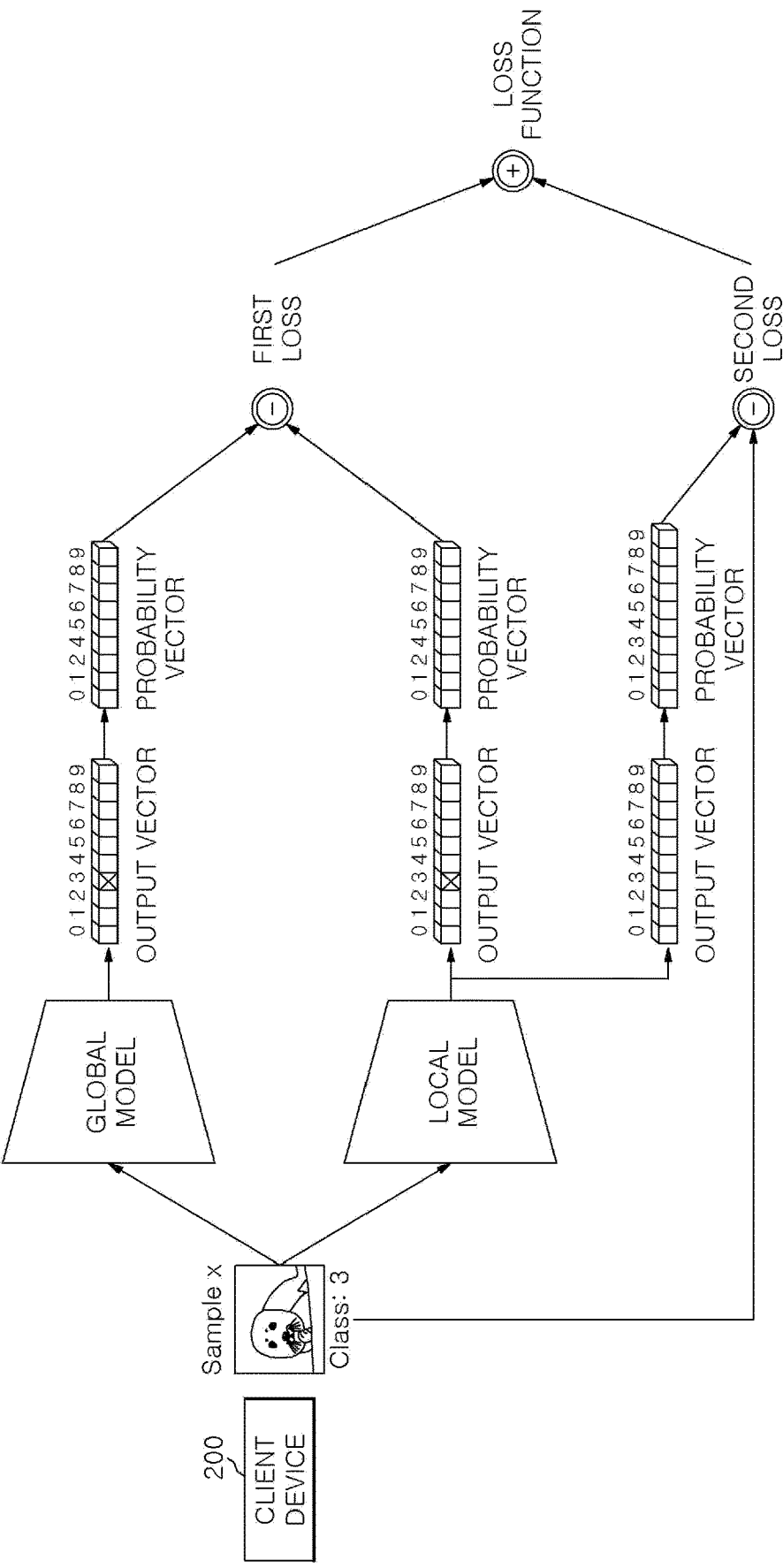
FIG. 4 is a detailed exemplary diagram illustrating an operation in which each client device 200 trains a local model according to the embodiment of the present disclosure.

FIG. 4 is a detailed exemplary diagram illustrating an operation in which each client device 200 trains the local model according to the embodiment of the present disclosure. FIG. 4 exemplifies that a probability value that a value output by the federated learning model is converted by an output vector (e.g., logit function) and by a probability vector (e.g., softmax function) is configured as the predicted value of the model. Meanwhile, the configuration of the conversion of the model output value shown in FIG. 4 is only an example, and the embodiment of the present document is not limited to this configuration.

Referring to FIG. 4, the client device 200 may store the global model and the local model, respectively, in order to train the local model based on the learning direction of the global model.

The client device 200 may store a global model that operates while maintaining the global parameters received from the central server 100.

The client device 200 may store a local model that generates new local parameters by updating the global parameters received from the central server 100 using data possessed by itself.

As an example, the loss function used for training the local model may include a first loss function for training the data itself held by the client device 200 and a second loss function for maintaining the learning direction of the global model.

The first loss function may include a first loss that makes a difference between the correct value of the data held by the client device 200 and the predicted value of the local model smaller. For example, the first loss function may include a cross-entropy function for a correct value of data possessed by the client device 200 and a predicted value of the local model.

The second loss function may include a second loss that makes a difference between the predicted value of the global model and the predicted value of the local model smaller. For example, the second loss function may include a cross-entropy function for the predicted value of the global model and the predicted value of the local model.

In this case, the second loss function may be configured to be trained in such a way that only losses for the remaining classes except for the correct class of training data are taken into account. For example, referring to FIG. 4, in an environment where the output class of the training data is '0, 1, 2, 3, 4, 5, 6, 7, 8, 9', it is assumed that it is turn to train 'Sample x' where the correct answer class is '3'. In this case, the second loss function may be configured to train in the direction of minimizing the loss of the predicted value of the global model and the predicted value of the local model only for the class corresponding to '0, 1, 2, 4, 5, 6, 7, 8, 9', which are the classes corresponding to FALSE, excluding '3' which is a class corresponding to TRUE.

To this end, in the second loss function, it can be configured that the loss of the predicted value of the global model and the predicted value of the local model for the class corresponding to TRUE among the output classes of the training data is set to '0', and the predicted value of the global model and the predicted value of the local model for the class corresponding to FALSE among the output classes of the training data is to be a cross entropy function.

In this case, the second loss function $\mathcal{L}$ NTD can be expressed as Equation 1 below by applying the cross-entropy to the prediction probability of the global model $$\tilde{q}_\tau^g$$

using the softmax and the prediction probability of the local model $$\tilde{q}_\tau^l$$

using the softmax. In Equation 1, uppercase 'C' means the number of classes, lowercase 'c' means the class of training data, and if the class 'c' corresponds to the correct answer 'y', sigma functions can be constructed such that the value of the cross entropy is not reflected.

$$\mathcal{L}_{NTD}(\tilde{q}_r^l, \tilde{q}_r^g) = -\sum_{c=1, c \neq y}^{C} \tilde{q}_r^g(c)\log\left[\frac{\tilde{q}_\tau^l(c)}{\tilde{q}_\tau^g(c)}\right], \text{ where} \qquad \text{[Equation 1]}$$

$$\begin{cases} \tilde{q}_\tau^l(c) = \dfrac{\exp(z_c^l/\tau)}{\sum_{\hat{c} \neq y}^{C} \exp(z_{\hat{c}}^l/\tau)} \\ \tilde{q}_\tau^g(c) = \dfrac{\exp(z_c^g/\tau)}{\sum_{\hat{c} \neq y}^{C} \exp(z_{\hat{c}}^g/\tau)} \end{cases} (\forall c \neq y)$$

Also, the loss function of the local model may be configured as 'loss function=first loss function+second loss function x weight'. That is, the loss function of the local model may be configured as a sum of a value obtained by applying a weight indicating the degree of reflection of the global model to the second loss function and the first loss function. In this case, the weight may be set to a real value greater than or equal to 0 and less than or equal to 1. Here, as the weight is set closer to 1, the local parameter may follow the learning direction of the global model, and as the weight is set closer to 0, the local parameter may be trained to follow the direction of data possessed by the client device 200.

FIG. 5 is a flowchart of a federated learning method according to the embodiment of the present disclosure.

Each step of the federated learning method according to FIG. 5 may be performed by the central server 100 and the client device 200 of the federated learning system 10 described through FIGS. 1 to 4, and the each step is described as follows.

In step S1010, the central server 100 may transmit the global parameters of the global model to each client device 200.

In step S1020, each client device 200 may apply a loss for the difference between the predicted value of the global model and the predicted value of the local model possessed by itself to the loss function to train the local model, and transmit the trained local parameters to the central server 100.

In step S1030, the central server 100 may receive the local parameters trained from each client device 200 and update the global model.

On the other hand, other than the steps shown in FIG. 5, according to various configurations of embodiments for performing the contents explained with FIGS. 1 to 4 described above, a new step of performing operations applicable in addition to the steps shown in FIG. 5 may be added. Meanwhile, since the configuration of the additional step and the operation for the elements that are the subject of each step to perform the corresponding step have been described with reference to FIGS. 1 to 4, the redundant description will be omitted.

FIG. 6 is comparison table of accuracies measured by applying the same dataset in a plurality of client devices with a federated learning model (FedNTD) generated by the federated learning system according to the embodiment of the present disclosure and with a federated learning model generated by an existing federated learning algorithm.

Referring to FIG. 6, 's' is a variable that sets the degree of data imbalance of each client device 200. It can be confirmed that the accuracy of the embodiment of the present disclosure (FedNTD) in various environments set according to the variables shown in FIG. 6 is significantly improved compared to the accuracy of the federated learning model generated by the existing algorithm.

According to the above-described embodiment, by applying the loss of the difference between the predicted value of the global model and the predicted value of the local model held by the client device 200 to the loss function used for training the local model, it is possible to prevent the forgetting problem by allowing the local models of each client device 200 to follow the learning direction based on the global model.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner.

Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed:

1. A federated learning system comprising:
a plurality of client devices; and
a central server configured to transmit at least one global parameter of a global model to each of the plurality of client devices, receive at least one local parameter of a local model trained from each of the plurality of client devices, and update the global model using the at least one local parameter,
wherein each of the plurality of client devices is configured to train the local model by applying a loss function, and transmit the at least one local parameter of the trained local model to the central server,
wherein the loss function includes:
a first loss function configured to reduce a difference between a label value of training data stored in each of the plurality of client devices and a predicted value of the local model; and
a second loss function configured to reduce a difference between a predicted value of the global model and the predicted value of the local model, and
wherein the local model is trained to follow a learning direction of the global model.

2. The system of claim 1, wherein each of the plurality of client devices is configured to store:
the global model that operates while maintaining the at least one global parameter; and
the local model that generates the at least one local parameter in which the at least one global parameter is updated using the training data stored in each of the plurality of client devices.

3. The system of claim 1, wherein the second loss function comprises a loss between the predicted value of the global model and the predicted value of the local model for a class corresponding to FALSE among output classes of the training data, and
wherein each of the plurality of client devices is configured to set the loss between the predicted value of the global model and the predicted value of the local model for a class corresponding to TRUE among the output classes of the training data to 0.

4. The system of claim 1, wherein the first loss function comprises a cross-entropy function for the label value of the training data stored in each of the plurality of client devices and the predicted value of the local model, and
wherein the second loss function comprises a cross-entropy function for a first probability of the predicted value of the global model and a second probability of the predicted value of the local model.

5. The system of claim 4, wherein the loss function of the local model is configured as a sum of a value of the second loss function applied by a weight indicating a degree of reflection of the global model, and a value of the first loss function.

6. The system of claim 5, wherein the weight is set to a real value in the range greater than or equal to 0 and less than or equal to 1.

7. The system of claim 1, wherein the predicted value of the global model comprises a probability value output by passing a logit function and a softmax function to an output value of the global model, and
wherein the predicted value of the local model comprises a probability value output by passing the logit function and the softmax function to an output value of the local model.

8. A federated learning method performed by a central server and a plurality of client devices, the method comprising:
transmitting, by the central server, at least one global parameter of a global model to each of the plurality of client devices;
training, by each of the plurality of client devices, a local model by applying a loss function;
transmitting, by each of the plurality of client devices, at least one local parameter of the trained local model to the central server; and
updating, by the central server, the global model by receiving the at least one local parameter trained from each of the plurality of client devices,
wherein the loss function includes:
a first loss function configured to reduce a difference between a label value of training data stored in each of the plurality of client devices and a predicted value of the local model; and
a second loss function configured to reduce a difference between a predicted value of the global model and the predicted value of the local model, and
wherein the local model is trained to follow a learning direction of the global model.

9. The method of claim 8, wherein each of the plurality of client devices is configured to store the global model that operates while maintaining the at least one global parameter, and the local model that generates the at least one local parameter in which the at least one global parameter is updated using the training data in each of the plurality of client devices.

10. The method of claim 8, wherein the second loss function comprises a loss between the predicted value of the global model and the predicted value of the local model for a class corresponding to FALSE among output classes of the training data, and wherein each of the plurality of client devices is configured to set the loss between the predicted value of the global model and the predicted value of the local model for a class corresponding to TRUE among the output classes of the training data to 0.

11. The method of claim 8, wherein the first loss function comprises a cross-entropy function for the label value of the training data stored in each of the plurality of client devices and the predicted value of the local model, and wherein the second loss function comprises a cross-entropy function for a first probability of the predicted value of the global model using a softmax function and a second probability of the predicted value of the local model using the softmax function.

12. The method of claim 11, wherein the loss function of local model is configured as a sum of a value of the second loss function applied by a weight indicating a degree of reflection of the global model, and a value of the first loss function.

13. The method of claim 12, wherein the weight is set to a real value in the range greater than or equal to 0 and less than or equal to 1.

14. The method of claim 8, wherein the predicted value of the global model comprises a probability value output by passing a logit function and a softmax function to an output value of the global model, and wherein the predicted value of the local model comprises a probability value output by passing the logit function and the softmax function to an output value of the local model.

15. A non-transitory computer-readable recording medium storing a computer program, the computer program, when executed by a processor, causing the processor to perform a federated learning method, the method comprising:

acquiring at least one global parameter of a global model;

training a local model by applying a loss function; and transmitting at least one local parameter of the trained local model to a central server, wherein the loss function includes:

a first loss function configured to reduce a difference between a label value of training data stored in each of the plurality of client devices and a predicted value of the local model; and a second loss function configured to reduce a difference between a predicted value of the global model and the predicted value of the local model, and wherein the local model is trained to follow a learning direction of the global model.

16. The non-transitory computer-readable recording medium of claim 15, wherein the second loss function comprises a loss between the predicted value of the global model and the predicted value of the local model for a class corresponding to FALSE among output classes of the training data.

17. The non-transitory computer-readable recording medium of claim 15, wherein the first loss function comprises a cross-entropy function for the label value of the training data stored in each of the plurality of client devices and the predicted value of the local model, and wherein the second loss function comprises a cross-entropy function for a first probability of the predicted value of the global model using a softmax function and a second probability of the predicted value of the local model using the softmax function.

* * * * *